US009280839B2

(12) United States Patent
Bowkett et al.

(10) Patent No.: US 9,280,839 B2
(45) Date of Patent: Mar. 8, 2016

(54) GENERATION OF A VECTOR GRAPHIC FROM A HAND-DRAWN DIAGRAM

(75) Inventors: Kevin Charles Bowkett, North Baddesley (GB); Scott John Clee, Winchester (GB); Geoffrey Stuart, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1978 days.

(21) Appl. No.: 12/362,168

(22) Filed: Jan. 29, 2009

(65) Prior Publication Data

US 2009/0189902 A1    Jul. 30, 2009

(30) Foreign Application Priority Data

Jan. 29, 2008    (EP) .................... 08150791

(51) Int. Cl.
G06T 11/20    (2006.01)
G06K 9/00    (2006.01)

(52) U.S. Cl.
CPC .......... *G06T 11/206* (2013.01); *G06K 9/00476* (2013.01)

(58) Field of Classification Search
USPC ........................................................ 345/589
See application file for complete search history.

(56) References Cited

U.S. PATENT DOCUMENTS 7,633,493 B2 * 12/2009 Syeda-Mahmood et al. . 345/179
2008/0144942 A1 * 6/2008 Besley et al. ................ 382/209

OTHER PUBLICATIONS

Michael J. Swain and Dana H. Ballard. 1991. Color indexing. Int. J. Comput. Vision 7, 1 (Nov. 1991), 11-32.*
Dorothea Blostein. 1995. General Diagram-Recognition Methodologies. In Selected Papers from the First International Workshop on Graphics Recognition, Methods and Applications, Rangachar Kasturi and Karl Tombre (Eds.). Springer-Verlag, London, UK, 106-122.*
Thorsten Bandlow, Michael Klupsch, Robert Hanek, and Thorsten Schmitt. 2000. Fast Image Segmentation, Object Recognition and Localization in a RoboCup Scenario. In RoboCup-99: Robot Soccer World Cup III, Manuela M. Veloso, Enrico Pagello, and Hiroaki Kitano (Eds.). Springer-Verlag, London, UK, 174-185.*
Paul Wais, Aaron Wolin, and Christine Alvarado. 2007. Designing a sketch recognition front-end: user perception of interface elements. In Proceedings of the 4th Eurographics workshop on Sketch-based interfaces and modeling (SBIM '07). ACM, New York, NY, USA, 99-106.*

(Continued)

*Primary Examiner* — Zhengxi Liu
(74) *Attorney, Agent, or Firm* — Yee & Associates, P.C.; Parashos Kalaitzis

(57) ABSTRACT

A method and system for generating a vector graphic from a color/object coded hand-drawn diagram are provided. A digital image of the diagram is generated and the key to the color/object code used to code the diagram is obtained. The digital image is then filtered to create a color-filtered image for each color in the key. Each filtered image is analyzed to determine the object type of objects in the filtered image according to the key, and then data extracted from the analysis of the filtered images is combined into a vector graphic diagram. The use of coded color in the diagram enables the image to be filtered based on color, which in turn aids the automated recognition of components in the diagram and significantly reduces the complexity of identifying each type of shape.

7 Claims, 3 Drawing Sheets

(56) References Cited

OTHER PUBLICATIONS

Beryl Plimmer and Isaac Freeman. 2007. A toolkit approach to sketched diagram recognition. In Proceedings of the 21st British HCI Group Annual Conference on People and Computers: HCI . . . but not as we know it—vol. 1 (BCS-HCI '07), vol. 1. British Computer Society, Swinton, UK, 205-213.*

Zhou, Q. et al, Color-invariant shape moments for object recognition, Proc. SPIE vol. 4304, p. 7-17 (2001) [abstract only], http://adsabs.harvard.edu/abs/2001SPIE.4304 . . . 7Z.

Berwick, D., et al., Spectral gradients for color-based object recognition and indexing, Computer Vision and Image Understanding, vol. 94 No. 1-3 p. 28-43 (2004) [abstract only], http://portal.acm.org/citation.cfm?id=1005418.1005421.

* cited by examiner

GENERATION OF A VECTOR GRAPHIC FROM A HAND-DRAWN DIAGRAM

CROSS REFERENCE TO RELATED APPLICATION

This application claims priority to Foreign Patent Application No. 08150791.5 entitled "GENERATION OF A VECTOR GRAPHIC FROM A HAND-DRAWN DIAGRAM", filed on Jan. 29, 2008, and claiming the same priority date, which is incorporated herein by reference and assigned to the assignee herein.

FIELD OF THE INVENTION

The present invention relates to the field of data processing and in particular to generation of a vector graphic from a hand-drawn diagram.

BACKGROUND

In the business environment there is a classic problem of using a whiteboard or flipchart to brainstorm a discussion and afterwards having to find a means of recording the outcome of the discussion. Traditionally, this would involve someone staying behind and copying the diagrammatic information from a whiteboard onto paper, taking a photo of the whiteboard or flipchart, or, with more modern whiteboards, the scribbles can either be printed or even saved as a digital image, such as a bitmap.

It is often useful to be able to share the information with multiple people, and to enable the recorded image to be modified or updated at a later point. Digital images, such as bitmaps, which are represented by a collection of pixels, are not always the easiest to modify. Often, such as for technical drawings or flow-charts, what is required is a vector object based graphic (also referred to as object-oriented graphics or geometric modeling), which uses geometrical primitives to create diagrams which can be manipulated and shared easily.

One approach to this might be to transfer a hand-drawn diagram to vector graphic format by manually recreating the information using a traditional mouse-based point-and-click drawing program, such as Microsoft® Visio. However, this technique requires a significant effort on behalf of the user.

Another option is to generate a digital copy of the diagram and then load the digital image into some image recognition software which would transfer the information into vector graphic format. However, this would require very complex image recognition software that would need to be able to make decisions based on certain assumptions. If different objects in the image overlap each other, then the intelligence (and assumptions) required to differentiate between the various objects would be significantly increased.

A digital image may be created using a digital camera, scanner or the like, or the diagram might be drawn directly onto a touch-sensitive screen of a computer processing device.

SUMMARY

Embodiments of the present invention provide a mechanism for automating the transfer of a hand drawn diagram, for example from a standard whiteboard or flipchart, to a vector graphic format with improved conversion speeds whilst minimizing the computer processing resources required to analyze and convert the image.

One embodiment of the present invention provides a method of generating a vector graphic from a color/object coded hand-drawn diagram. The method comprises generating a digital image of the diagram, obtaining a key to the color/object code used to code the diagram, and filtering the digital image to create a color-filtered image for each color in the key. Each filtered image is analyzed to determine the object type of objects in the filtered image according to the key; and then data extracted from the analysis of the filtered images is combined into a vector graphic diagram.

Another embodiment of the present invention provides system for generating a vector graphic from a color/object coded hand-drawn diagram. The system comprises a digital imaging component for generating a digital image of the diagram, a key to the color/object code used to code the diagram, a filtering component for filtering the digital image and generating a color-filtered image for each color in the key, an analysis component for analyzing each filtered image to determine the object type of objects in the filtered image according to the key; and a combining component for combining the data extracted from the analysis of all the filtered images into a vector graphic diagram.

The use of coded color in the drawing enables the image to be filtered based on color, which in turn aids the automated recognition of components in a hand-drawn diagram and significantly reduces the complexity of identifying each type of shape.

BRIEF DESCRIPTION OF THE DRAWINGS

Preferred embodiments of the present invention will now be described by way of example only, with reference to the accompanying drawings in which.

DESCRIPTION OF PARTICULAR EMBODIMENTS

Figure 1:
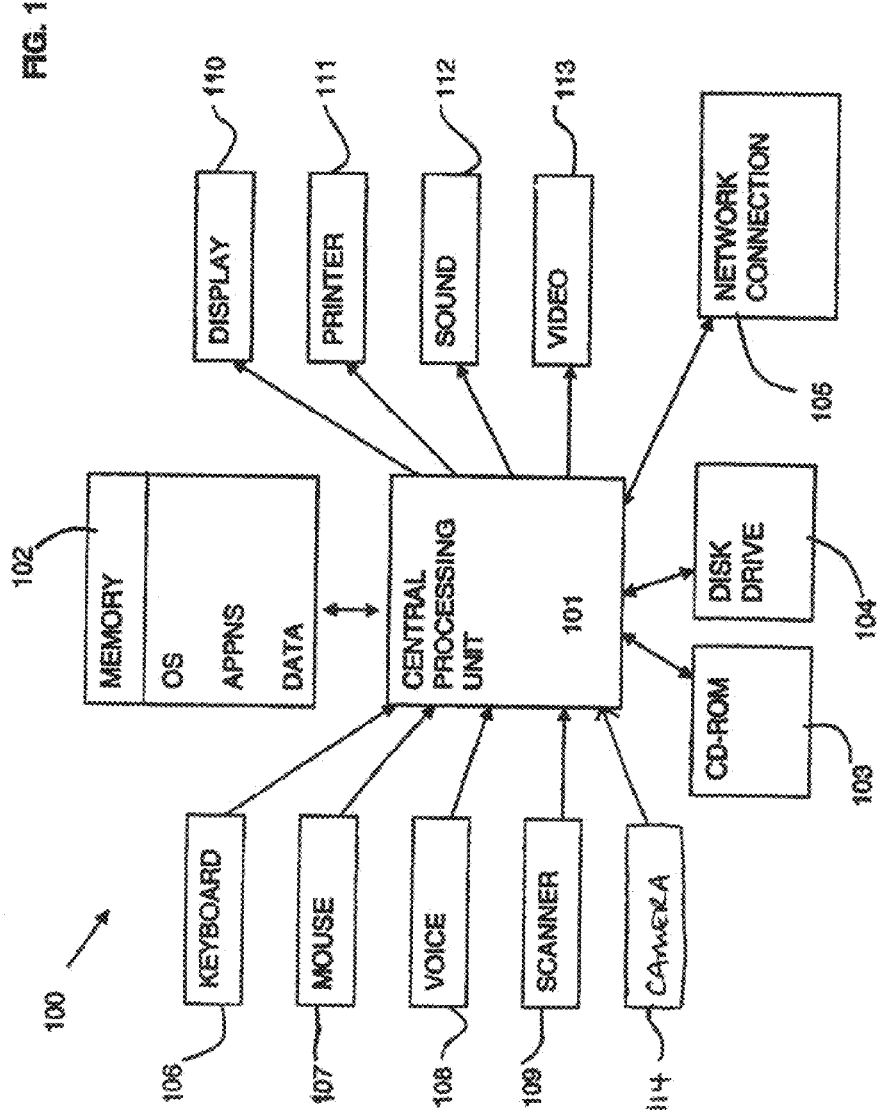
FIG. 1 is a block diagram of an illustrative general purpose computer system in which a system in accordance with the present invention may be implemented.

Referring to FIG. 1, a general embodiment of a computer system 100 is shown in which the present invention may be implemented. A computer system 100 has a central processing unit 101 with primary storage in the form of memory 102 (RAM and ROM). The memory 102 stores program information and data acted on or created by the programs. The program information includes the operating system code for the computer system 100 and application code for applications running on the computer system 100. Secondary storage includes optical disk storage 103 and magnetic disk storage 104. Data and program information can also be stored and accessed from the secondary storage.

The computer system 100 includes a network connection means 105 for interfacing the computer system 100 to a network such as a local area network (LAN) or the Internet. The computer system 100 may also have other external source communication means such as a fax modem or telephone connection.

The central processing unit 101 includes inputs in the form of, as examples, a keyboard 106, a mouse 107, voice input 108, a scanner 109 for inputting text, images, graphics or the like, and a digital camera 114. Outputs from the central processing unit 101 may include a display means 110, a printer 111, sound output 112, video output 113, etc.

In a distributed system, a computer system 100 as shown in FIG. 1 may be connected via a network connection 105 to a server on which applications may be run remotely from the central processing unit 101 which is then referred to as a client system.

Figure 2:
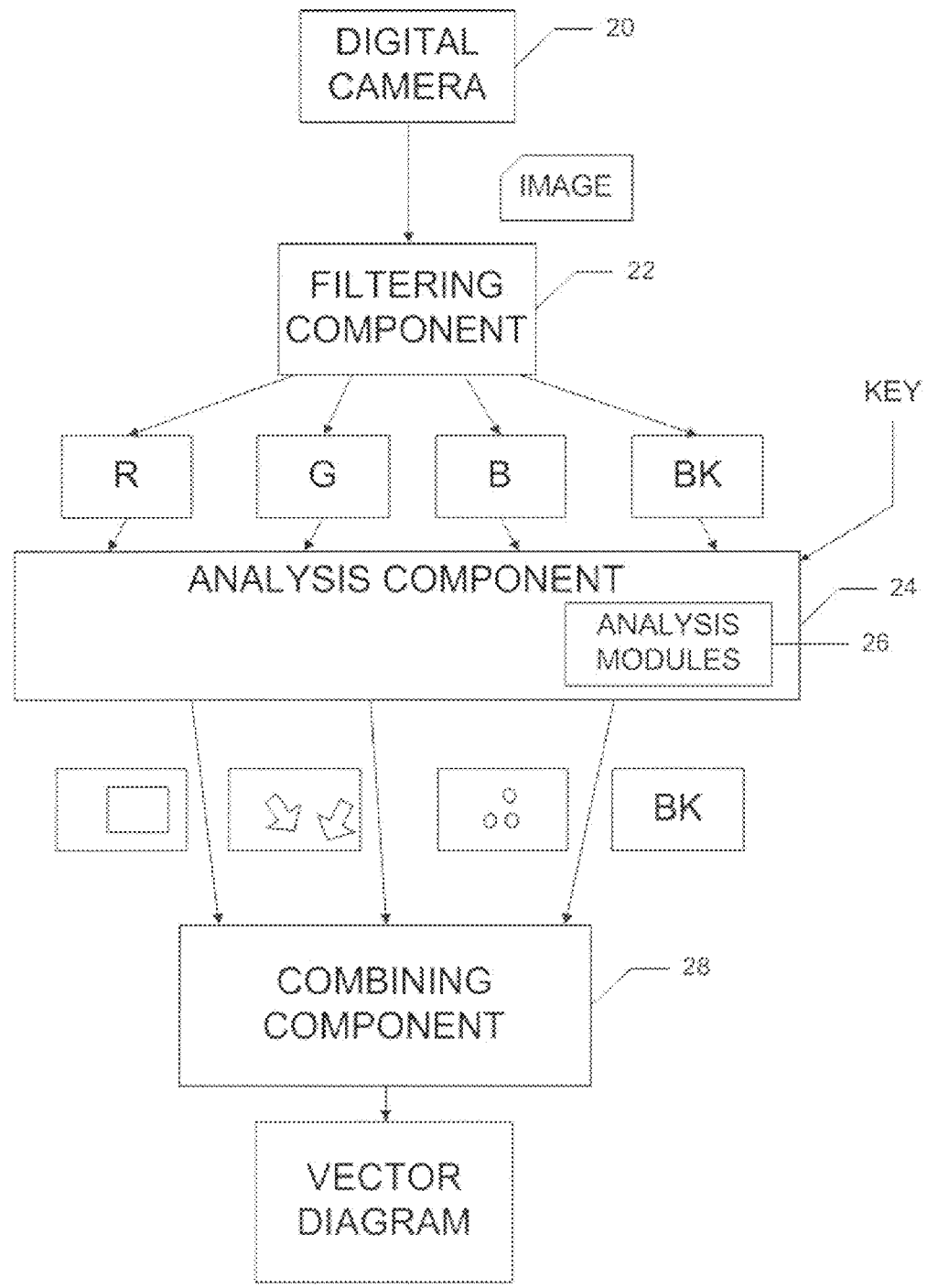
FIG. 2 shows a sample embodiment of a system according to a preferred embodiment of the invention.
Figure 3:
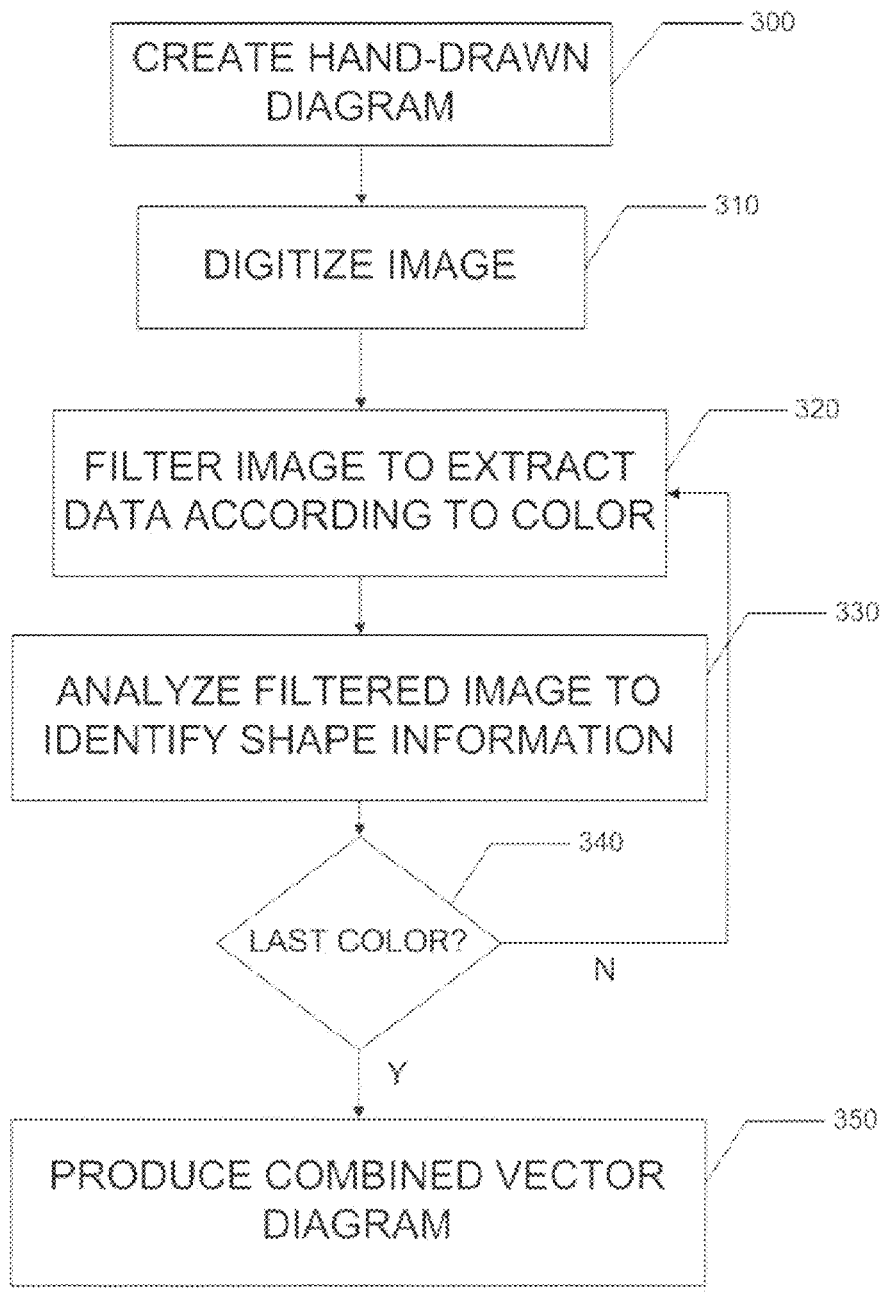
FIG. 3 shows an illustrative flowchart describing a method according to a preferred embodiment of the invention.

FIG. 2 shows the components of a system according to a preferred embodiment of the invention. The system comprises a digital camera 20, a filtering component 22, an analysis component 24 and a combiner 28. The function of these components will be described with reference to FIG. 3.

For each graphical component (rectangle, arrows etc.) in the toolkit of a vector based presentation tool, a color is associated with that object type, according to a color or object key. The user draws different components of a diagram using different colors, in accordance with this key. For example, a typical color/object key (KEY 1) could be:

Red→Rectangle
Green→Arrow
Blue→Circle
Black→Text

This key can be predefined or decided upon by the user at the time of creation of the hand-drawn diagram.

When the drawing has been completed 300, a digital image of the drawing is created 310, for example by camera 20 taking a digital photo. Next, the digital image is filtered 320 by the filtering component 22 to create a plurality of filtered images which each pick out differently colored objects, and hence different shapes. The filtering step enables data specific to a particular color to be extracted. Thus an image filtered for red components, will represent all rectangles from the original diagram, and so on according to the color/object key used. The filtered image is then passed to the analysis component 24.

The analysis component 24 comprises a plurality of object recognition modules 26, each specializing in the recognition of a particular type of object. These modules may use any known shape recognition algorithm, such as, for example, those referred to in "Algorithm Performance Contest", Selim Aksoy et al. IEEE Proceedings of the 15th International Conference on Pattern Recognition, 2000, p 870-876. The particular shape recognition algorithms used are not part of the present invention.

The analysis component first determines the type of object associated with the filtered image in accordance with the color/object key. Then the most appropriate object recognition module is selected to determine the relative size, position, and possibly orientation, of the objects in the filtered image. Preferably, there is one module supplied for each type (shape) of graphic object within the color/object key. Thus, in step 330, the analysis component selects a particular recognition module which is specifically designed to look for objects of the type associated with the color for which the image has been filtered, and uses this to identify the relative size, and position of those shapes in a first filtered image.

The filtering and analysis steps may then be repeated for the next color. When these steps have been carried out in respect of all the colors in the color/object key being used, the extracted data from all the filtered images is then combined 350 into a single vector graphic diagram.

Thus, after each color has been filtered and all instances of each object have been rebuilt into a vector diagram, a complete vector based representation of the original image is obtained. The only prerequisite is that the user draws the original diagram using different colors for different types of object.

The mechanism can also be applied to any text items which are included in the original diagram. Text is given its own color mapping (e.g. black in the example earlier) and the image filtered to extract the textual (black) components of the drawing. The analysis component can then select a handwriting recognition module, (similar to that often used in Personal Digital Assistants, or PDAs), and then add each text label as a text field to the vector diagram.

In a modification, instead of carrying out steps 320 and 330 for each color/shape in turn, these steps might be carried out simultaneously for all color/shape entries in the key. Also, the combined diagram could be put together in stages, adding in the data for one color/shape at a time, rather than combining all the data together in a single step.

Embodiments of the invention include that each analysis module need only analyze the types of shapes for which it has been designed and it does not need to be concerned about additional drawings cluttering up the image since they have been "removed" using the color filters. This lowers the complexity that is required for each of the recognition algorithms, and significantly decreases the time taken to convert a diagram into vector graphic format, as well as the overall processing overhead. In addition, if a recognition algorithm for a new shape is to be added to the system, then the new shape is simply associated with a new color and the new recognition algorithm.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disc or tape, optically or magneto-optically readable memory such as compact disk (CD) or Digital Versatile Disk (DVD) etc, and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method for generating a vector diagram, comprising:
   generating a digital image of an original diagram, wherein the original diagram is a hand-drawn diagram and wherein a plurality of objects comprising the original diagram are color coded according to a key;
   obtaining the key;
   filtering the digital image by color to create a corresponding color-filtered image for each corresponding color in the key;
   analyzing each corresponding color-filtered image, wherein analyzing comprises determining a corresponding object type associated with the corresponding color-filtered image and selecting a corresponding object recognition module based upon the corresponding object type associated with the corresponding color-filtered image, and wherein the analyzing creates an analysis; and
   combining data obtained from the analysis to create a vector diagram.

2. The method of claim 1, where analyzing further comprises:
   applying the corresponding object recognition module to the corresponding color-filtered image; and
   determining a relative size and a relative position of a corresponding object in the corresponding color-filtered image.

3. A system for generating a vector diagram, the system comprising:
   a central processing unit;
   a memory, connected to the central processing unit, having application code comprising a digital imaging component, a filtering component, an analysis component, and a combining component, stored thereon for execution by the central processing unit; and
   a network connection, connected to the central processing unit;
   wherein the central processing unit executes the application code to:
   operate the digital imaging component for generating a digital image of an original diagram;
   obtain a key, wherein a plurality of objects comprising the original diagram are color coded according to the key;
   operate the filtering component for filtering the digital image by color and creating a corresponding color-filtered image for each corresponding color in the key;
   operate the analysis component for analyzing each corresponding color-filtered image, wherein analyzing comprises determining a corresponding object type associated with a corresponding color-filtered image and selecting a corresponding object recognition module based upon the corresponding object type associated with the corresponding color-filtered image, and wherein the analyzing creates an analysis; and
   operate the combining component for combining data obtained from the analysis to create a vector diagram.

4. The system of claim 3, wherein the digital imaging component comprises a digital camera.

5. The system of claim 3, wherein the analysis component comprises a plurality of object recognition modules.

6. The system of claim 3, where analyzing further comprises:
   applying the corresponding object recognition module to the corresponding color-filtered image; and
   determining a relative size and a relative position of a corresponding object in the corresponding color-filtered image.

7. A computer program product for generating a vector diagram, the computer program product comprising a non-transitory computer readable storage medium having computer executable instructions stored thereon, wherein the computer executable instructions when executed by a computer direct the computer to:
   generate a digital image of an original diagram, wherein the original diagram is a hand-drawn diagram and wherein a plurality of objects comprising the original diagram are color coded according to a key;
   obtain the key;
   filter the digital image by color to create a corresponding color-filtered image for each corresponding color in the key;
   analyze each corresponding color-filtered image, wherein analyzing comprises determining a corresponding object type associated with a corresponding color-filtered image and selecting a corresponding object recognition module based upon the corresponding object type associated with the corresponding color-filtered image, and wherein the analyzing creates an analysis; and
   combine data obtained from the analysis to create the vector diagram.

* * * * *